June 4, 1935.  E. SCHWEITER  2,003,474
FLUID FLOW METER
Filed April 29, 1932
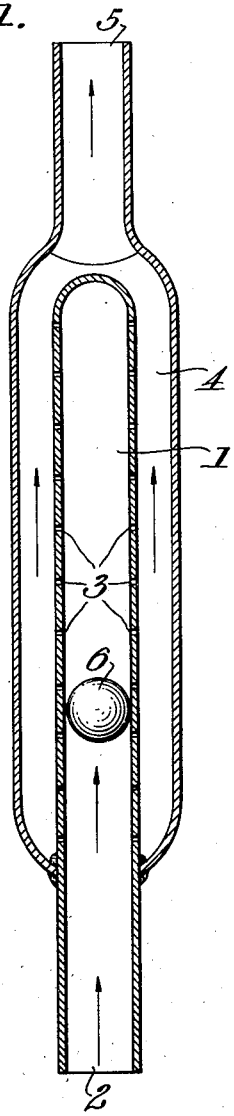
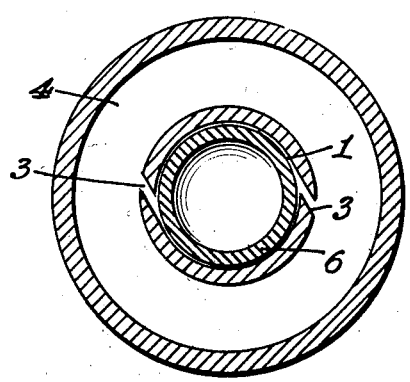
Inventor:
Eugen Schweitzer,
By Byrne, Townsend & Potter,
Attorneys.

Patented June 4, 1935

2,003,474

UNITED STATES PATENT OFFICE 2,003,474

FLUID FLOW METER

Eugen Schweitzer, Frankfort-on-the-Main, Germany, assignor to I. G. Farbenindustrie Aktiengesellschaft, Frankfort-on-the-Main, Germany Application April 29, 1932, Serial No. 608,331
In Germany May 8, 1931

2 Claims. (Cl. 73—167)

The present invention relates to a device for measuring the rate of flow of gases and liquids.

This device comprises the combination of a vertical cylindrical inner tube provided at its lower end with an inlet, and with tangentially directed openings spaced longitudinally of said inner tube, a jacket tube surrounding said perforated inner tube and provided with an outlet and a movable ball in said inner tube, the diameter of said ball being but a little smaller than the inner diameter of the tube, so that, when the current of gas or liquid flows through the inner tube, the ball rises, its altitude depending on the intensity of the current.

One form of construction of the device for measuring the rate of flow of gases is represented in section in Fig. 1 of the annexed drawing in which I is the vertical measuring tube closed at one end and having the inlet 2 and openings 3 spaced longitudinally of the measuring tube. 4 is the jacket tube with the outlet 5. 6 is the ball. The gas to be measured enters at 2, escapes through the openings 3 into the jacket tube 4 and leaves the device at 5. Fig. 2 is a cross-section of the said measuring device in which I is the vertical measuring tube provided with tangentially directed openings 3 disposed in pairs opposite to one another. 4 is the jacket tube and 6 is the ball which is hollow.

The openings of the inner tube may be disposed in pairs opposite to one another, and at equal distances one above the other. The gas flowing in at the inlet 2 passes through the lateral openings 3 into the jacket tube 4. The position that is occupied in the tube I by the ball which may be hollow, is the higher, the stronger the current of gas is. The equilibrium of the ball i. e. its altitude in the tube depends on the dynamic pressure and the difference in static pressure in the space above and beneath the ball. The openings 3 are given a somewhat tangential direction, i. e. the axes of the openings are in a plane lying vertically to the axis of the inner tube and do not meet the axis of the inner tube, so as to cause the ball to rotate, as may be seen from Fig. 2 of the annexed drawing.

The measuring tube and the jacket tube may be made of any suitable transparent material, for instance of glass. The device is suitable for measuring gases and liquids of any kind, for instance for measuring narcotic gases.

I claim:

1. A device for measuring the rate of flow of gases and liquids comprising the combination of a vertical cylindrical inner tube, provided with an inlet at its lower end and with tangentially directed openings spaced longitudinally of said inner tube, a jacket tube surrounding said perforated tube and provided with an outlet and a movable ball in said inner tube, the diameter of said ball being but a little smaller than the inner diameter of the tube, so that, when the current flows through the inner tube, the ball rises, its altitude depending on the intensity of the current.

2. A device for measuring the rate of flow of gases and liquids comprising the combination of a vertical cylindrical inner tube, provided with an inlet at its lower end and with tangentially directed openings in its wall spaced longitudinally of said inner tube and disposed in pairs opposite to one another, a jacket tube surrounding said perforated tube and provided with an outlet and a movable ball in the inner tube, the diameter of said ball being but a little smaller than the inner diameter of the tube, so that, when the current flows through the inner tube, the ball rises, its altitude depending on the intensity of the current.

EUGEN SCHWEITZER.